(No Model.)

A. J. MOXHAM.
RAILROAD RAIL AND PROCESS OF UNITING SAME.

No. 497,808. Patented May 23, 1893.

WITNESSES:

INVENTOR

ATTORNEY.

UNITED STATES PATENT OFFICE.

ARTHUR J. MOXHAM, OF JOHNSTOWN, PENNSYLVANIA.

RAILROAD-RAIL AND PROCESS OF UNITING SAME.

SPECIFICATION forming part of Letters Patent No. 497,808, dated May 23, 1893.

Application filed April 27, 1892. Serial No. 430,928. (No model.)

*To all whom it may concern:*

Be it known that I, ARTHUR J. MOXHAM, of Johnstown, in the county of Cambria and State of Pennsylvania, have invented a new and useful Improvement in Processes of Uniting Metallic Pieces Together by Welding, which invention is fully set forth and illustrated in the following specification and accompanying drawings.

The object of this invention is to weld successfully together pieces of metal which have considerable extent of welding surface, and an equal weld made at all points. When the electric current is connected to two sides of the ends of the end pieces to be welded together, the tendency of the current is to the shortest path, and hence the parts of the pieces near the points of electrical contact first become welded, being the shortest path of the electric circuit. There being nothing to induce the current to flow subsequently through a longer path, the central portion of the two pieces, being with two circuits the longest path, would not become welded together and in order to obviate this, in general terms, to be hereinafter more specifically described, I make two pieces of such form that initially they touch only at the central portion of the piece, which causes the current to pass through that portion and when pressure is applied, the metal at the points welded together is upset and the remaining portions of the ends of the two pieces of metal are brought in contact with each other so that the current will then pass through the said remaining portions, and thus the two pieces are welded together and the flow of heat equalized.

I will describe my invention as used for electrically welding two rails together, although I do not intend to limit myself to any particular form of rail or to any particular form of the two pieces to be welded together.

Figure 2:
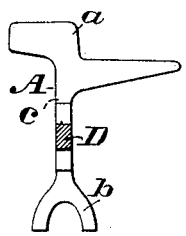
Figure 1:
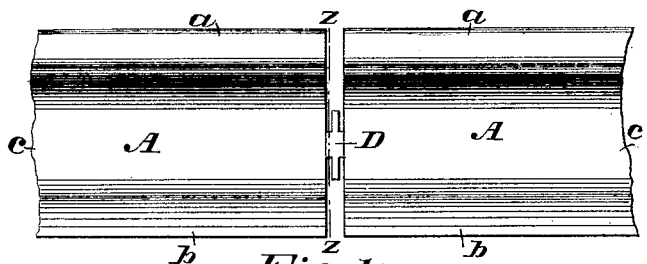
Figure 4:
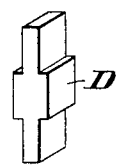
Figure 3:
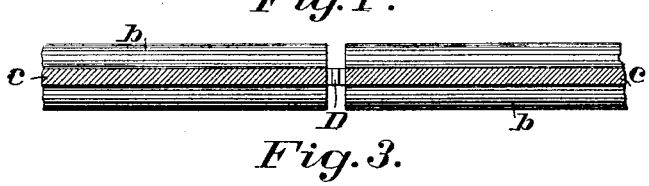
Figure 7:
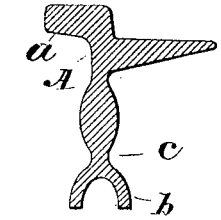
Figure 5:
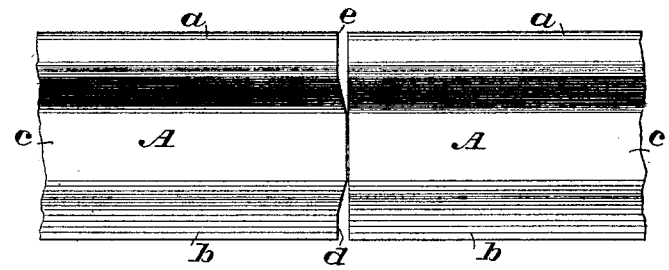
Figure 6:
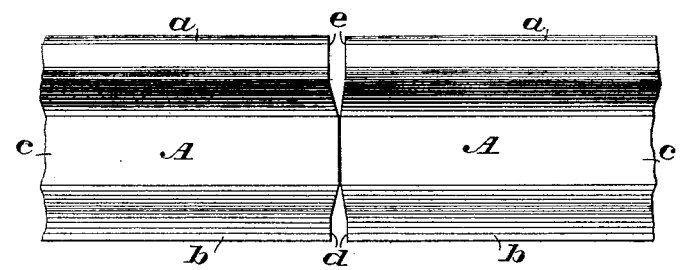

In the accompanying drawings, Figure 1 shows two rails in side elevation, before being united according to my invention. Fig. 2 is a sectional view taken on the line Z, Z, of Fig. 1, looking to the right. Fig. 3 is a horizontal sectional plan of Fig. 1, below the heads of the rails. Fig. 4 is a view in perspective of the part marked D, in the preceding figures, detached and enlarged. Figs. 5 and 6 are side elevations of rails showing other methods in which my invention may be applied as hereinafter described. Fig. 7 is a view in cross section taken through the point at which the two rails are welded together.

In said figures the several parts are respectively indicated by reference letters as follows:

The letter A, indicates two railroad rails, each having a head $a$, web $c$, and bifurcated bottom $b$, though my invention may be applied to many other forms of rail than that shown.

The letter D, (Figs. 1, 2 and 3) indicates a contact block or plate which is interposed between the ends of the rails and located approximately as shown in Fig. 1. The form of this contact block is not material and it may be varied in form without materially affecting the results, so long as it preserves connection with the webs of the rails first, thus leaving a space between the respective heads and feet.

The process of uniting the rails is as follows: The two rails A having been placed in the position shown in Fig. 1 with the contact block D between the same, an electric current in two circuits is passed through the rails through contact with the heads and feet respectively of each rail by means of the usual transformers. The tendency of the current is to the shortest path, and hence if the ends of the rails to be welded were in uniform contact for the whole of their abutting ends, the portions immediately adjoining the contact block, namely, the heads and feet, would become first welded, being the shortest path of electric circuit. There being nothing to induce the current subsequently to flow through a longer path the web portion would not become welded. In order to obviate this, the contact is provided as shown, so that the only circuit is first through the web. When a welding heat has been reached at this point, the two rails are forced toward each other until by the upsetting of the contact point and of the adjacent sections of the webs the opposing heads and bases of the rails are brought into contact. The electric current will then pass from head to head and from base to base this now being the shorter circuit, and, as these members become heated to the welding degree, the rails are again pressed toward each other and in so doing the previously welded sections are still further compressed, or upset. The result is that not only are the rails welded throughout the engaging surfaces, but, being enlarged at the intersections of the webs, as shown in Fig. 7, the weld is exceptionally strong, by reason of the extra thickness caused by the upsetting above mentioned.

Instead of using the contact block D, said block may be dispensed with and the same result accomplished by cutting away the top and bottom of one rail, as shown at e, d, Fig. 5, or by similarly cutting both rails as shown in Fig. 6.

The advantages of this invention are as follows: Railroad rails after rolling are usually sawed off square at the ends and it has been found extremely difficult to electrically weld together the ends of such rails. The difficulty has been to so distribute the electric current as to heat all the parts and thereby secure a welding heat throughout the whole of the surfaces to be welded, the opposing heads and bases of the rails being raised to a welding heat before the webs of the rails. In electric welding of rails it is sometimes preferable to use contacts for the passage of the current at the top and bottom of the rails, thus providing two currents or circuits simultaneously passing through the rails. All electricity tends to flow in the shortest path or circuit, so that, with uniform contacts for the whole of the abutting ends of rails, the shortest circuit is the part closest to the source of supplying the electric current. Hence this part of the rail becomes first welded and there being no inducement for the current to subsequently take a longer path or circuit, the electric energy is wasted in continuing to heat the already welded portion instead of taking the longer circuit and welding the other portion. This difficulty is obviated, as above described, by first passing the electric current through the webs of the rails. As these parts are upset in welding, the opposing heads and feet of the rails are thus brought into contact, so that the current may pass through and heat these members, and when these have reached a welding heat and are pressed together in welding, the previously welded sections are still further upset, the result being that the opposing ends of the rails are welded throughout. It will thus be seen that the first contact is made at the point which would be the longest circuit, the contact being so arranged that as the two rails are pressed together, the circuit will be continually shortening until the final weld is made in the shortest circuit.

In arranging the contacts, due consideration must be had to the proportional and sectional area of the different parts of the mass operated on, as this will influence the result, the essence of the invention being to use what is virtually a constantly adjusting contact, which concentrates the electricity first at the most difficult point of welding and leaves the easiest point of welding the last point operated on.

Having thus fully described my said invention, I claim—

1. The hereinbefore described method of electrically welding two pieces of metal together, which consists in forming the adjacent ends of the pieces of metal with advance intermediate contact portions, and one or both of said contact portions with a limited metallic surface, passing an electric current through the ends of said pieces on opposite sides of the center into their central portion and exerting pressure upon said pieces.

2. The hereinbefore described method of electrically welding two pieces of metal together, which consists in first welding the central portion of the adjacent ends of said pieces together by passing an electric current through the ends of said pieces on opposite sides of the center into their central portion and then welding together the remaining portions of the adjacent ends.

3. The hereinbefore described method of electrically welding two rails together, consisting in forming the rails with advance intermediate contact portions of their webs, passing an electric current through the head and foot of said rails on opposite sides of the center into their central portion at the ends of the rails and applying pressure to said rails.

4. The hereinbefore described method of electrically welding girder rails together, which consists in forming the adjacent ends of the rails with intermediate advance contact portions, passing an electric current through the tops and bottoms of said rails at their ends on opposite sides of the center into their central portion and applying pressure to said rails.

5. The hereinbefore described method of welding two metallic pieces together, which consists in constructing said pieces at the portions to be welded together, so that they are adapted initially to be in metallic contact only at the central portion, passing a current of electricity through the ends of said pieces on opposite sides of said central portion and applying pressure.

6. The hereinbefore described method of electrically welding two rails together, which consists in forming the adjacent ends of the rails with advance contact portions, cutting away portions of said rails above and below either or both of said advance contact portions, passing an electric current through the heads and feet of the rails at their ends and through the advance contact portions and exerting pressure upon the ends of the rails.

7. The hereinbefore described method of welding two metallic pieces together, which consists in interposing between the pieces to be welded together a metallic piece of less cross section than the pieces to be welded together, passing a current of electricity through the ends of each of said pieces on opposite sides of the central portion and applying pressure thereto.

8. The process herein described of integrally uniting girder rails, consisting in first welding the webs of said rails together by passing currents of electricity through the heads and feet thereof into said webs and then welding together the heads and feet of said rails by said current.

9. The process herein described of integrally uniting girder rails, consisting in first constructing said rails at the portions to be welded together so that they are initially in metallic contact only at the webs of said rails, then passing currents of electricity through the tops and bottoms of said rails and applying pressure to said rails.

10. The process herein described of integrally uniting girder rails, which consists in interposing between the ends of the rails to be welded together, a metallic piece of less cross section than the rails, passing currents of electricity through the tops and bottoms of said rails and applying pressure to said rails.

ARTHUR J. MOXHAM.

Witnesses:
A. J. BRYAN,
D. BRYAN.